(12) United States Patent
Hammond

(10) Patent No.: US 8,360,451 B2
(45) Date of Patent: Jan. 29, 2013

(54) AIR SUSPENSION SYSTEM

(75) Inventor: William Alexander Hammond, Drouin (AU)

(73) Assignee: Base Suspension Pty Ltd, Melbourne, Victoria (AU)

( * ) Notice: Subject to any disclaimer, the term of this patent is extended or adjusted under 35 U.S.C. 154(b) by 4 days.

(21) Appl. No.: 13/087,442

(22) Filed: Apr. 15, 2011
(Under 37 CFR 1.47)

(65) Prior Publication Data
US 2011/0187070 A1   Aug. 4, 2011

Related U.S. Application Data

(62) Division of application No. 11/993,235, filed as application No. PCT/AU2005/000925 on Jun. 24, 2005, now Pat. No. 7,946,603.

(51) Int. Cl.
*B60G 9/04* (2006.01)
(52) U.S. Cl. ... 280/124.157; 280/124.158; 280/124.159; 280/124.16
(58) Field of Classification Search ........... 280/124.157, 280/124.158, 124.159, 124.16, 124.161
See application file for complete search history.

(56) References Cited

U.S. PATENT DOCUMENTS

| | | | | |
|---|---|---|---|---|
| 2,848,248 A * | 8/1958 | Hansen et al. | ......... | 280/124.106 |
| 2,903,272 A | 9/1959 | Bordenkircher et al. | | |
| 2,998,261 A * | 8/1961 | Bartlett | ........................ | 280/81.1 |
| 3,063,732 A | 11/1962 | Harbers et al. | | |
| 3,147,024 A * | 9/1964 | Brockman | .................... | 280/81.1 |
| 3,197,231 A * | 7/1965 | Holzman | ....................... | 280/683 |
| 4,335,901 A * | 6/1982 | Gladish | ...................... | 280/6.151 |
| 4,736,958 A * | 4/1988 | Armstrong | .................. | 280/6.151 |
| 5,046,752 A * | 9/1991 | Stephens et al. | .............. | 280/678 |
| 5,322,321 A * | 6/1994 | Yopp | .......................... | 280/6.158 |
| 5,374,077 A * | 12/1994 | Penzotti et al. | ............... | 280/683 |
| 5,467,595 A * | 11/1995 | Smith | .............................. | 60/410 |
| 6,149,142 A * | 11/2000 | Penzotti | ..................... | 267/64.19 |
| 6,431,557 B1 * | 8/2002 | Terborn et al. | ............... | 280/6.15 |
| 6,666,474 B2 * | 12/2003 | Pavuk | .......................... | 280/677 |
| 6,824,143 B2 * | 11/2004 | Choi | ........................... | 280/5.514 |
| 7,104,547 B2 * | 9/2006 | Brookes et al. | ............ | 280/6.153 |
| 7,389,994 B2 * | 6/2008 | Trudeau et al. | ............ | 280/6.153 |
| 7,396,029 B2 * | 7/2008 | Hecker et al. | ............. | 280/124.16 |
| 7,644,933 B2 * | 1/2010 | Brookes et al. | ............ | 280/5.502 |
| 7,690,663 B2 * | 4/2010 | Haire | ...................... | 280/124.157 |
| 7,841,608 B2 * | 11/2010 | Morris et al. | ............ | 280/124.16 |
| 2005/0161891 A1 * | 7/2005 | Trudeau et al. | ............ | 280/5.507 |
| 2005/0236781 A1 * | 10/2005 | Brookes et al. | ............ | 280/5.507 |
| 2006/0170168 A1 * | 8/2006 | Rotz et al. | .................. | 280/5.501 |
| 2007/0085292 A1 * | 4/2007 | Hecker et al. | ............ | 280/124.16 |

FOREIGN PATENT DOCUMENTS

| | | |
|---|---|---|
| DE | 4408810 A1 | 9/1995 |
| EP | 354438 B1 | 2/1990 |
| GB | 1223874 A1 | 3/1971 |
| GB | 2223463 A1 | 4/1990 |
| JP | 3271012 A | 12/1991 |

* cited by examiner

*Primary Examiner* — Toan To
(74) *Attorney, Agent, or Firm* — Rothwell, Figg, Ernst & Manbeck, P.C.

(57) ABSTRACT

An air suspension system for a multi-axle vehicle having air bags (4,5; 6,7; 8,9; 10,11; 44 to 49) supporting either side of the axles (2,3; 41 to 43), including separate air lines (18 to 25; 50 to 55) respectively connecting each air bag to a level control valve (16,17; 56,57) via manifolds (26,27; M) and air lines (28,29; 54,55) to independently control air supply to the bags on either side, the separate air lines being of the same size and length to ensure that substantially the same volume of air is supplied to each bag to improve the responsiveness and stability of the system.

17 Claims, 5 Drawing Sheets

AIR SUSPENSION SYSTEM

This application is a divisional of U.S. Ser. No. 11/993,235 filed Dec. 20, 2007, now U.S. Pat. No. 7,946,603, which is a 35 U.S.C. 371 National Phase Entry Application from PCT/AU2005/000925 filed Jun. 24, 2005, the disclosures of which are incorporated herein in its entirety by reference.

FIELD

This invention relates to improvements in air suspension systems for load carrying prime mover and trailer vehicles having multiple axles supported by air bags on either side of each axle.

BACKGROUND

Air suspension systems for load carrying prime mover vehicles can include as many as eight air suspension bags supporting the two driven axles in pairs on either side of each axle. In one well-known prime mover, the pairs of air bags are connected by a common large diameter air lines extending between correspondingly positioned air bags on adjacent axles.

The common air lines are each connected by an air line to a control valve which controls the air supply to the common air lines to adjust the inflation of the air bags to ensure that the prime mover is kept level as it is driven over variable road conditions.

In other air suspension systems, such as the Hendrickson HAS Series suspension, each axle is supported at either side by a single large air bag mounted on a frame hanger to which the axle is connected.

While the known air suspension systems may be adequate for slowly changing road conditions, they are not sufficiently responsive to rapidly changing conditions such as are experienced in cornering and on rough sections of road. As a result the vehicle becomes unstable, reducing driver control, increasing driver fatigue, causing increased tyre wear and potential damage to the freight.

SUMMARY

It is an object to provide an improved air suspension system which is more responsive under changing driving conditions.

The invention provides an air suspension system for a multi-axle vehicle having at least one air bag supporting each side of each axle, a level controlling valve for separately controlling air flow to the air bags on each side respectively, separate air lines connecting each valve and each of the air bags on either side respectively, said separate air lines being such that substantially the same volume of air is supplied to each air bag to maintain stability under changing driving conditions.

The invention further provides an air suspension system for a multi-axle vehicle having at least one air bag supporting each side of each axle, a level controlling valve for separately controlling air flow to the air bags on each side respectively, a separate air line connected between each valve and a distribution manifold, separate air lines connected between each manifold and each of the air bags on either side respectively, the first mentioned air lines being of substantially the same size and length, and the second mentioned airlines between the respective manifolds and the respective air bags being of the same size and length whereby substantially the same volume of air is supplied to each air bag to maintain stability under changing driving conditions.

In comparison with the known air suspension systems, in which the air lines to each air bag are of variable length, a system embodying the invention will allow the air bags to respond to the changing road conditions maintaining stability and enabling the vehicle to be more easily controlled.

In one form, each axle has a pair of air suspension bags supporting each side of the axle and separate air lines extend from the valve controlling each side to the separate air bags.

In one such arrangement, the air bags on each side are interconnected by common air lines extending between air bags in similar positions on adjacent axles, the separate air lines being connected to the common air lines adjacent the respective air bags.

In another form, each axle is supported by a single air bag at each side of the axle.

The vehicle may take the form of a prime mover having driven axles, or a trailer having passive axles.

To further improve responsiveness, each level controlling valve has a separate air feed line from the air supply tank of the prime mover. The size and length of the separate feed lines is preferably the same.

The level controlling valves are preferably actuated by control means extending to a common rigid bar fixed to the means attaching the air bags on either side to one axle.

In another form the invention provides an air suspension system for a multi-axle vehicle having at least one air bag supporting each side of each axle, a level controlling valve for separately controlling air flow to the air bags on each side respectively, separate air lines connecting each valve and each of the air bags on either side respectively, each level controlling valve having a separate air feed line from an air supply tank of the vehicle to improve the responsiveness of the system.

DESCRIPTION OF EMBODIMENTS

Figure 1:
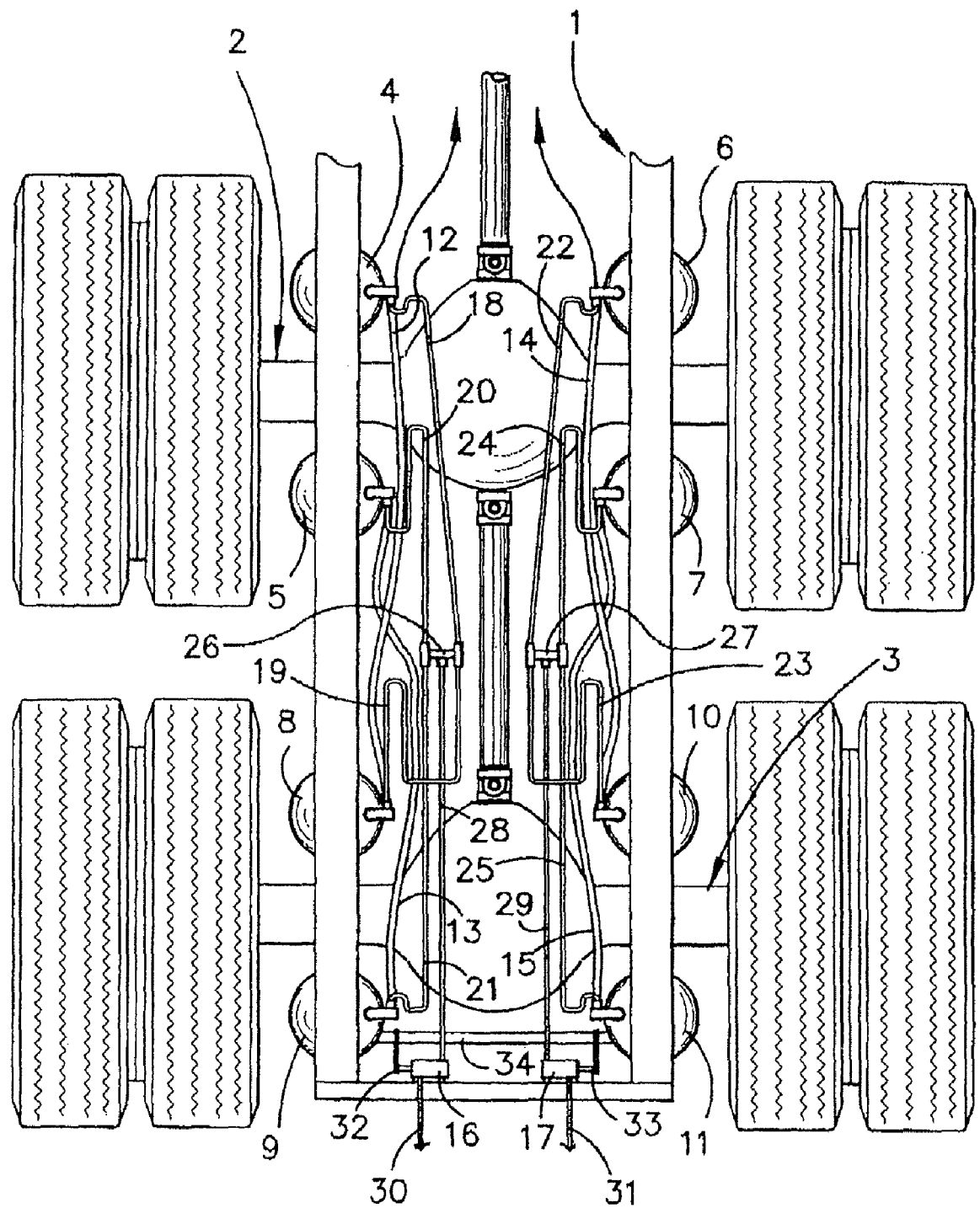
FIG. 1 is a schematic fragmentary plan view of a prime mover chassis having an air suspension system embodying the invention.

Referring first to FIG. 1, the prime mover chassis 1 has front and rear driven wheeled axles 2 and 3, which are supported in a known manner on the chassis 1 by pairs of air suspension bags 4 and 5, 6 and 7, 8 and 9 and 10 and 11, positioned as illustrated on either side of the axles 2 and 3.

The air bags 4 and 8, 5 and 9, 6 and 10 and 7 and 11 are connected in a known manner by common large capacity air lines 12 to 15 respectively, which are usually about 5 cm (2 inches) in diameter. The air suspension system so far described is typical of a Kenworth Airglide 200 as found on a Kenworth T 904 prime mover.

Under normal circumstances, the common lines 12 to 15 on either side of the axles are connected by an air line (not shown) to suitable ride height or level controlling valves 16 and 17, such as Hadley valves, but in the present embodiment they are supplied with air, at the air line connector fittings of each air bag, by separate air lines 18 to 21 respectively on one side and 22 to 25 on the other side, connected to junction fittings 26 and 27 which are supplied with air by lines 28 and 29 extending from the level control valves 16 and 17. To ensure an adequate supply of air to each valve 16 and 17, separate air lines 30 and 31 are connected to an air supply tank (not shown) mounted on the prime mover in the usual manner. The length and size of these lines are also the same.

To ensure a balanced supply air of substantially the same volume and pressure to each air bag, the separate air lines 18 to 21 and 22 to 25 are of substantially the same size or internal diameter and length. For similar reasons, the air lines 28 and 29 between the valves 16 and 17 are of substantially the same size and length.

The lines to the front air bags 4 and 6 are connected, in the usual manner, as indicated by the arrows, to the gauges and dump switch (not shown) in the cabin of the prime mover. Since this aspect does not from part of the invention it will not be further described.

The provision of the separate air lines 18 to 21 and 22 to 25, and the connection of these lines to the separately supplied level control valves 16 and 17, ensure that an equal volume of air is rapidly supplied to each of the air bags so that they respond appropriately to changes in road conditions relayed to the valves 16 and 17 by their control rods 32 and 33 via a rigid bar 34 mounted under the bags 9 and 11 as illustrated. The air lines 18 to 21 and 22 to 25 suitably have a bore diameter of about 12 mm (½ inch).

Figure 2:
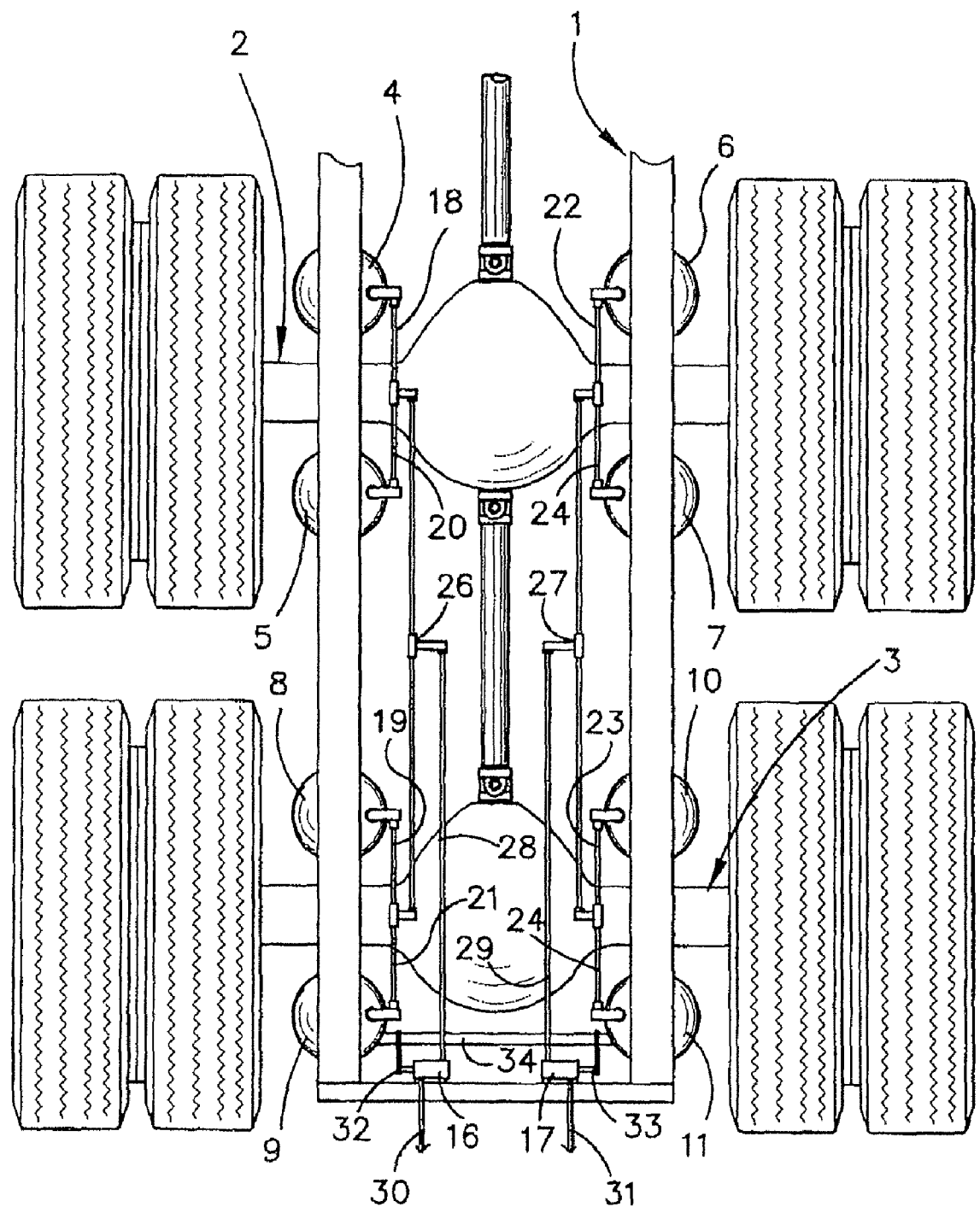
FIG. 2 is a similar plan view of a prime mover chassis having a modified air suspension embodying the invention.

In the embodiment of FIG. 2, the common air lines 12 to 15 have been omitted. Otherwise the system is as described in relation to FIG. 1 and the same reference numerals identify similar components. In this embodiment, the feed lines 28 and 29 from the level valves 16 and 17 are connected to branch lines which are connected by manifolds 26 and 27 to the lines 18 to 25 as illustrated. It will be noted that the manifolds 26, 27 are positioned centrally in the branch lines, and the connections of the branch line to the similarly sized lines 18 to 24 are centralised so that the air lines 18 to 25 are of equal length. It will be appreciated that a line arrangement similar to that shown in FIG. 1, absent the common lines 12 to 15, could also be used.

Figure 3:
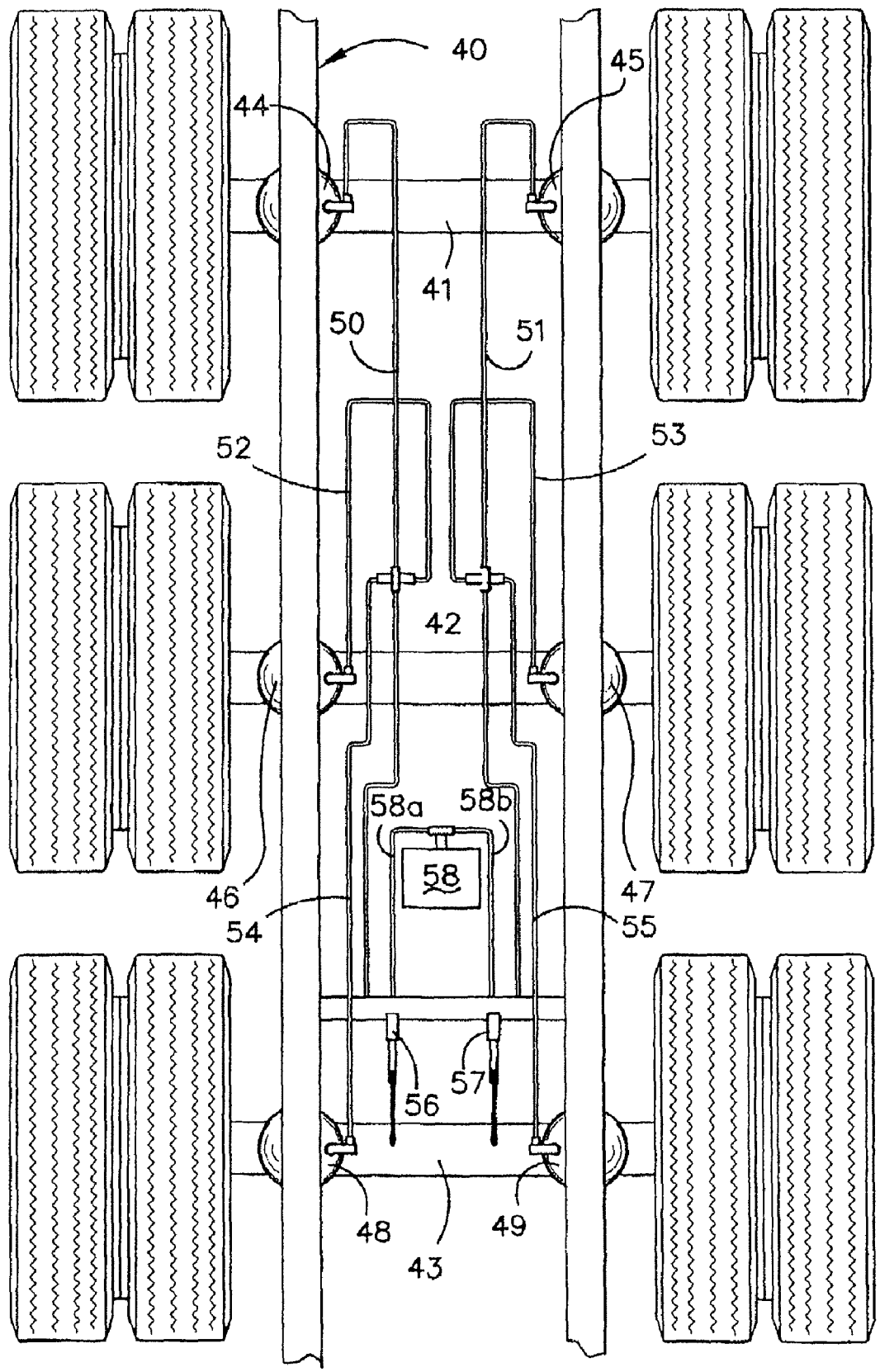
FIG. 3 is a schematic fragmentary plan view of a trailer chassis having an air suspension system embodying the invention.

FIG. 3 schematically illustrates a trailer chassis 40 having three wheeled axles 41, 42 and 43, supported on each side by air suspension bags 44 to 49. The bags are fed with air by separate air lines 50 to 55, of equal size and length, respectively extending from distribution manifolds M fed on either side air supply lines 54 and 55 connected to level control valves 56 and 57 supplied with air from supply tank 58 by air feed lines 58 and 59 of equal size and length. The control valves are operated similarly to the above arrangements by control rods 59 and 60 attached to the rear axle 43. Again it is important that the air lines 50 to 55 are of substantially the same size and length and that the supply lines 58a and 58b are of substantially the same size and length. This arrangement operates similarly to the prime mover system to provide stable control of the trailer to further improve the controllability of the prime mover and trailer combination.

Figure 4:
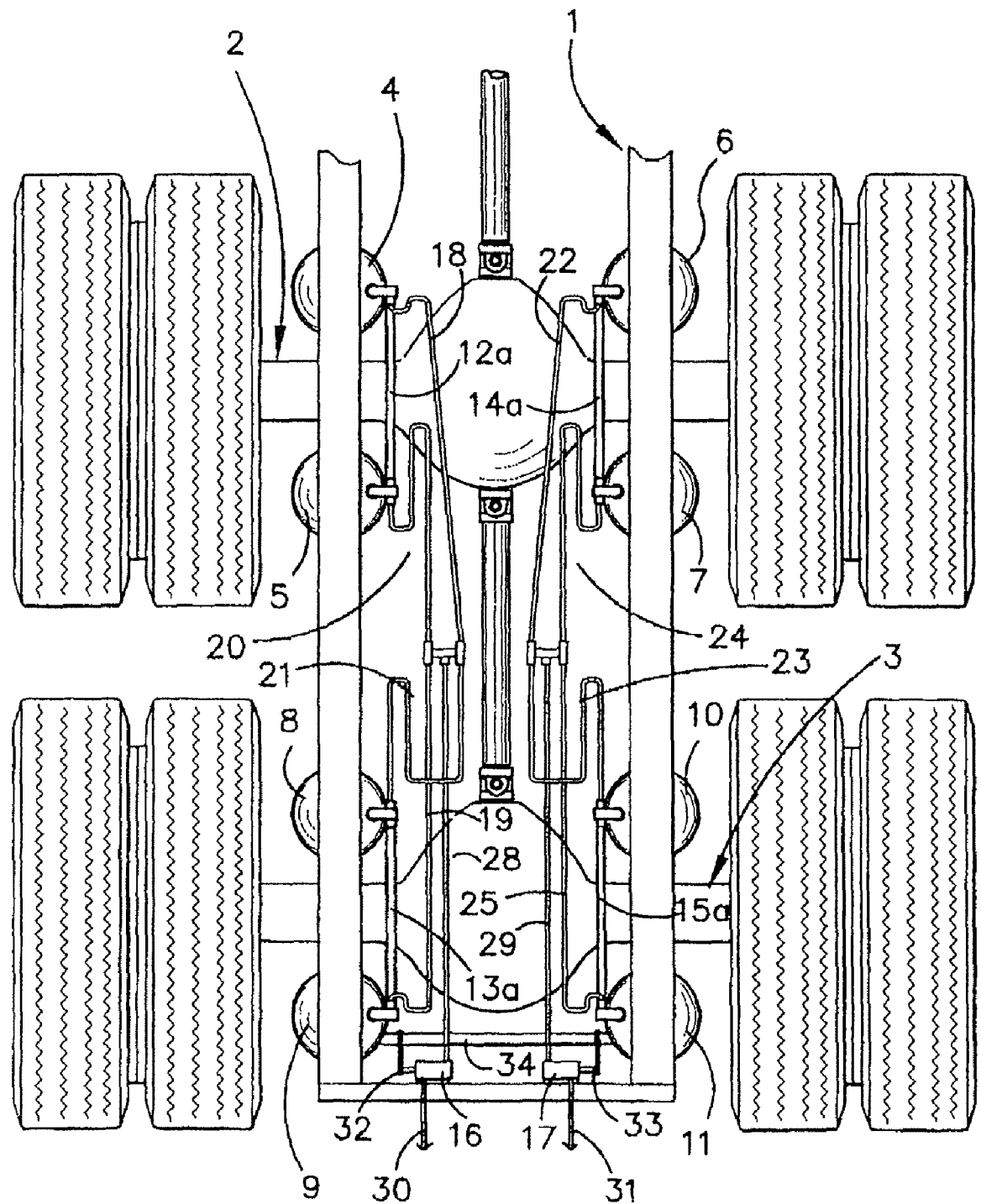
FIG. 4 is a schematic fragmentary plan view of a prime mover having another modified air suspension system embodying the invention.

In the embodiment of FIG. 4, the pairs of air suspension bags 4,5;6,7;8,9 and 10,11 are connected to each other by common air lines 12a to 15a, similar to common air lines 12 to 15 in FIG. 1. As in the embodiment of FIG. 1, air is supplied to the air line connector fittings of each air bag 4 to 11 by separate air lines 18 to 25 connected to distribution manifolds 27 and 28 supplied with air by air lines 28 and 29 from level control valves 16 and 17. This arrangement operates in the same way as the embodiment of FIG. 1 and again the separate air lines 18 to 25 are of substantially the same size and length as are the air lines 28 and 29.

Figure 5:
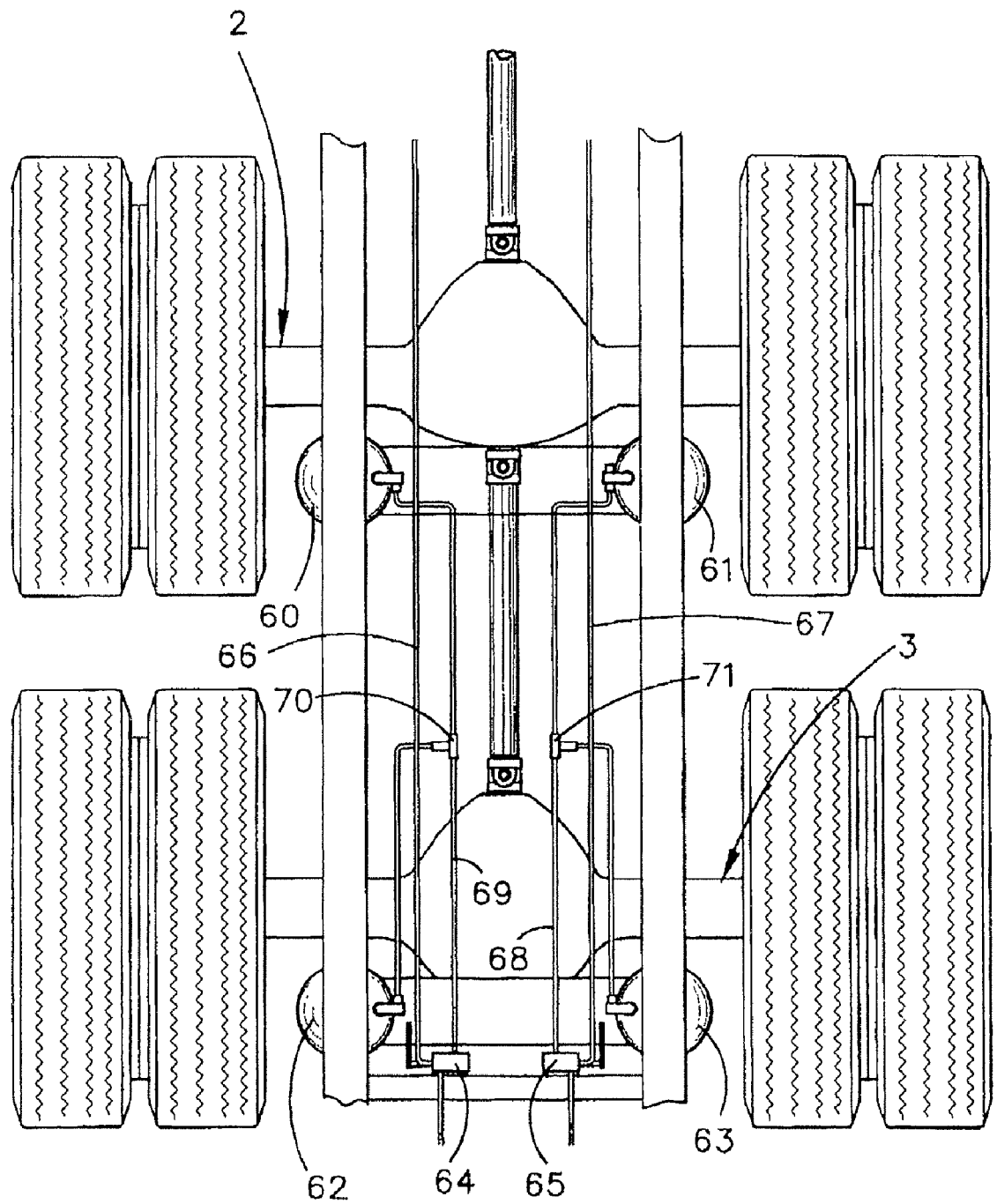
FIG. 5 is a schematic plan view of a further modified suspension system embodying the invention.

In the embodiment of FIG. 5, which is a schematic representation of a Hendrickson HAS suspension, the axles 2,3 are supported by larger air bags 60 to 63, in a known manner. As in the earlier embodiments, ride height adjusting valves 64, 65 are separately supplied with air from the air tank (not shown) by air lines 66,67 of equal size and length. Air supply lines 68,69 of equal size and length extend from the valves 64,65 to distribution manifolds 70,71, and air lines of equal size and length extend from the manifolds to each air bag 60 to 63. This embodiment operates in the same manner as the earlier embodiments.

In each of the embodiments the separate air lines suitably have a bore diameter of 12 mm. Other sizes may be used with similar results provided the size and length of the air lines in each set or group (eg 18 to 25, 28 and 29, 30 and 31 etc) are the same.

While embodiments of the invention have been described in connection with an air suspension typical of Kenworth prime movers, such as the Airglide 200 on the T 904 prime mover, it will be appreciated that the invention is equally applicable to other Kenworth suspensions, such as the Airglide or AG 400, AG 460 or the AG 690. Similar comments apply to the schematically illustrated Hendrickson HAS suspension. The invention is equally applicable to any air bag suspension system having one or more air bags supporting each driven axle.

The invention claimed is:

1. A method of improving stability of a vehicle during rapidly changing driving conditions comprising independently controlling air flow to right and left sides of a vehicle axle having a right side on a right side of the vehicle and a left side on a left side of the vehicle by independently controlling air flow to at least one air chamber on the right side of the vehicle axle and to at least one air chamber on the left side of the vehicle axle to lift the vehicle side in need of lifting and to lower the vehicle side in need of lowering in response to driving conditions that are potentially unstable.

2. The method of claim 1, wherein said air flow is controlled by right and left vehicle side level controlling valves connected to air chambers on the right and left sides of said vehicle, respectively.

3. The method of claim 2, wherein said valves are connected to said air chambers via air feed lines of the same size and length.

4. The method of claim 2, wherein each of said right and left vehicle side level controlling valves are connected by separate air lines.

5. The method of claim 1, further comprising supplying substantially the same volume of air to each air chamber.

6. The method of claim 1, wherein each axle has a pair of air suspension bags supporting each side of the axle.

7. The method of claim 6, wherein the air suspension bags on each vehicle side are additionally interconnected by common air lines extending between air bags in similar positions on adjacent axles, the separate air lines being connected to the common air lines at or near the respective air bags so as to supply air directly to the air bags and to the common air lines.

8. The method of claim 2, further comprising providing a separate air feed line from an air supply tank of the vehicle to each level controlling valve to improve responsiveness.

9. The method of claim 2, further comprising actuating the level controlling valves by control means extending to a common rigid bar fixed to the means attaching the air chambers on either side to one axle.

10. The method of claim 6, further comprising supplying air directly to each air bag and to the common air lines, wherein the pairs of air bags on either side of each axle are connected by common air lines and the separate air lines are directly connected to each air bag.

11. The method of claim 7, wherein the common air lines have a larger capacity than the separate air lines.

12. The method of claim 11, wherein the common air lines have about four times the capacity of the separate air lines.

13. The method of claim 1, wherein each axle is supported by a single air bag on either side of the axle.

14. The method of claim 1, wherein the vehicle is a prime mover having driven axles, a trailer having passive axles.

15. The method of claim 1, wherein said vehicle is a multi-axle vehicle and wherein each of said axle sides is associated with at least one air chamber.

16. The method of claim 2, wherein said right side and left side level controlling valves control air flow to said air bags on each respective vehicle side in response to dynamic vehicle body movement as the vehicle encounters changing driving conditions.

17. A method of enabling a driver to more easily control a vehicle comprising installing in said vehicle an air suspension system configured to independently control air flow to right and left sides of a vehicle axle having a right side on a right side of the vehicle and a left side on a left side of the vehicle by independently controlling air flow to at least one air chamber on the right side of the vehicle axle and to at least one air chamber on the left side of the vehicle axle, wherein during rapidly changing driving conditions, said air suspension system lifts the vehicle side in need of lifting and lowers the vehicle side in need of lowering in response to driving conditions.

* * * * *